United States Patent
Fujii

(10) Patent No.: US 6,281,293 B1
(45) Date of Patent: Aug. 28, 2001

(54) MIXTURE COMPOSITION OF SYNTHETIC RESIN AND RUBBER

(75) Inventor: Yoshinori Fujii, Kawasaki (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/402,040

(22) PCT Filed: Mar. 25, 1998

(86) PCT No.: PCT/JP98/01304

§ 371 Date: Sep. 28, 1999

§ 102(e) Date: Sep. 28, 1999

(87) PCT Pub. No.: WO98/44037

PCT Pub. Date: Oct. 8, 1998

(30) Foreign Application Priority Data

Mar. 31, 1997 (JP) .................................................. 9-098050

(51) Int. Cl.⁷ ...................................................... C08L 9/00
(52) U.S. Cl. ........................................... 525/233; 525/234
(58) Field of Search ........................... 524/502; 525/233, 525/234

(56) References Cited

U.S. PATENT DOCUMENTS

| 5,266,640 | 11/1993 | Karg et al. | |
|---|---|---|---|
| 5,346,957 | * 9/1994 | Tsuji | 525/102 |
| 5,858,579 | * 1/1999 | Ito | 430/5 |

FOREIGN PATENT DOCUMENTS

| 374264B1 | 4/1994 | (EP) . |
|---|---|---|
| 383926B1 | 4/1994 | (EP) . |
| 0 890 610 A1 | 1/1999 | (EP) . |
| 1 597 178 | 9/1981 | (GB) . |
| 2 120 258 A | 11/1983 | (GB) . |
| 112656/1988 | 5/1988 | (JP) . |
| 1-306445 | 12/1989 | (JP) . |
| 1-311142 A | 12/1989 | (JP) . |
| 191656/1990 | 7/1990 | (JP) . |
| 269138/1990 | 11/1990 | (JP) . |
| 122103/1991 | 5/1991 | (JP) . |

OTHER PUBLICATIONS

International Search Report—PCT/JP98/01304 dated May 26, 1998.

* cited by examiner

Primary Examiner—Paul R. Michl
(74) Attorney, Agent, or Firm—Armstrong, Westerman, Hattori, McLeland & Naughton, LLP

(57) ABSTRACT

The present invention is directed to a polymer blend having improved properties comprising: (A) 90 to 10% by weight of a thermoplastic or thermosetting resin; and (B) 10 to 90% by weight of a shear-treated rubber obtained by subjecting a nitrile group-containing highly saturated copolymer rubber to a high-shear treatment in the presence of an anti-oxidant so as to lower the Mooney viscosity of the copolymer rubber by 15 units or more, said shear-treated rubber having a Mooney viscosity of 5 to 135, a molecular weight distribution (Mw/Mn) of 3.0 to 5.0 and a storage stability characterized by that the incremental increase in the Mooney viscosity of said shear-treated rubber during a 30 day storage under an ambient condition in air is not more than 10 units.

9 Claims, No Drawings

MIXTURE COMPOSITION OF SYNTHETIC RESIN AND RUBBER

FIELD OF THE INVENTION

The present invention relates to a mixture composition of a synthetic resin and a rubber having improved compatibility. More specifically, the present invention relates to a mixture composition having improved properties, said mixture composition containing a thermoplastic or thermosetting resin and a nitrile group-containing highly saturated copolymer rubber having enhanced processibility.

BACKGROUND ART

It is well known that a nitrile group-containing highly saturated copolymer rubber which may be obtained by hydrogenating the carbon-carbon double bonds of an acrylonitrile-butadiene copolymer rubber has good heat resistance, weather resistance and oil resistance. Accordingly, there have been attempts to exploit such desirable properties of the copolymer rubber in the preparation of thermoplastic elastomer compositions by blending said rubber with a synthetic resin such as a polyamide (see Japanese Unexamined Patent Publication Nos. 269138/1990, 191656/1990 and 112656/1988). These compositions possess a good balance of such desirable properties as high impact resistance, resistance against aging by heat, weather resistance and mechanical strength.

However, in case the viscosity of a nitrile group-containing highly saturated copolymer rubber is greatly different from that of a synthetic resin to be blended therewith, a mixture composition results due to the incompatibility between them. Therefore, it is required to improve, in particular, the processibility of the nitrile group-containing highly saturated copolymer rubber.

It is suggested a method for imparting good processibility to a nitrile group-containing highly saturated copolymer rubber through lowering the Mooney viscosity of the rubber by a high shear treatment (Japanese Unexamined Patent Publication No. 122103/1991). This suggested method comprises the step of subjecting a hydrogenated nitrile rubber having a Mooney viscosity of 55 to 100 to high shear conditions in the presence of an oxygen donor, e.g., oxygen or a peroxide, as well as a radical transfer agent. The shearing induces thermal degradation of the rubber, thereby lowering the Mooney viscosity of the rubber to the range of 30 to 50.

In this method, the oxygen donor functions to stabilize free radicals generated during the thermal degradation. However, the Mooney viscosity of the rubber produced by this method is known to increase during storage, even in the process of an added anti-oxidant, due to gelation caused by residual peroxides as well as by carboxyl groups, carbonyl groups and others generated by the high shear treatment.

Accordingly, it is an object of the invention to improve the physical properties of a mixture composition obtained by blending a thermoplastic or thermosetting resin with a nitrile group-containing highly saturated copolymer rubber, by way of enhancing the compatibility of said rubber with the resin.

The present inventors have endeavored to develop polymeric compositions that meet the afore-mentioned objective and found that the impact resistance of a mixture composition of a polyamide resin and a nitrile group-containing highly saturated copolymer rubber can be improved over that of a conventional blend, by way of pretreating the hydrogenated acrylonitrile-butadiene copolymer rubber under high shear conditions in a twin screw extruder in the presence of an anti-oxidant to lower its Mooney viscosity to a specific level.

DISCLOSURE OF THE INVENTION

In accordance with an aspect of the present invention, therefore, there is provided a mixture composition comprising:

(A) 90 to 10% by weight of a thermoplastic or thermosetting resin; and (B) 10 to 90% by weight of a rubber obtained by subjecting a nitrile group-containing highly saturated copolymer rubber to a high-shear treatment in the presence of an anti-oxidant so as to lower the Mooney viscosity of the copolymer rubber by 15 units or more, having a Mooney viscosity of 5 to 135, a molecular weight distribution (Mw/Mn) of 3.0 to 5.0 and a increase 10 units or less in the Mooney viscosity of said rubber in 30 days storage in air under room temperature after lowering Mooney viscosity.

The present invention is described below in more detail.

The high shear-treated nitrile group-containing highly saturated copolymer rubber employed in the present invention is a rubber having a lowered Mooney viscosity, obtained by the steps of hydrogenating carbon-carbon double bonds of a nitrile group-containing unsaturated copolymer rubber and treating the hydrogenated rubber with a high shear force in the presence of an anti-oxidant. The nitrile group-containing unsaturated copolymer rubber may be a copolymer of an ethylenically unsaturated nitrile such as acrylonitrile, methacrylonitrile and α-chloroacrylonitrile with a conjugated diene such as 1,3-butadiene, isoprene, 1,3-pentadiene and 2,3-dimethyl-1,3-butadiene, or a terpolymer or a multi-component copolymer obtainable by copolymerizing the above two types of monomers with at least one copolymerizable monomer, e.g., vinyl aromatic compounds, acrylic acid, methacrylic acid, alkyl acrylate, alkyl methacrylate, alkoxyalkyl acrylate, alkoxyalkyl methacrylate, cyanoalkyl acrylate, cyanoalkyl methacrylate and the like.

The nitrile group-containing highly saturated copolymer rubber to be treated with a high shear force comprises repeating units derived from an ethylenically unsaturated nitrile monomer in an amount of 10 to 60% by weight, preferably 20 to 50% by weight and has 70% or more, preferably 90% or more, of the hydrogenated carbon-carbon double bonds by the partially hydrogenation. If the content of the nitrile monomer-derived repeating units in the rubber is too small, the oil resistance of the rubber becomes unsatisfactory, and if its content is too great, the elasticity of the rubber is undesirably low. Further, if the degree of hydrogenation of the carbon-carbon double bonds exceed 30% by weight, the impact strength of the rubber deteriorates. The nitrile group-containing highly saturated copolymer rubber of the present invention generally has good oil resistance, heat resistance and weather resistance.

Representative examples of the nitrile group-containing highly saturated copolymer rubber may include a hydrogenated acrylonitrile-butadiene copolymer rubber, hydrogenated acrylonitrile-isoprene copolymer rubber, hydrogenated acrylonitrile-butadiene-acrylate copolymer rubber, and hydrogenated acrylonitrile-butadiene-acrylate-methacrylic acid copolymer rubber.

The nitrile group-containing highly saturated copolymer rubber to be treated with a high shear force generally has a Mooney viscosity ($ML_4$) in the range of 60 to 150, and an iodine value below 120, preferably below 60.

Such a nitrile group-containing highly saturated copolymer rubber is treated with a high shear force so that the Mooney viscosity of the rubber decreases by 15 units or more, preferably 30 units or more and more preferably 60 units or more, from the range of 60 to 150, to provide a rubber having a Mooney viscosity ranging from 5 to 135, preferably 20 to 120 and more preferably 20 to 90.

The high shear treatment may be conducted in the substantial absence of an oxygen donor such as oxygen, peroxides, nitrates and the like, at a temperature ranging from 200 to 380° C., preferably 240 to 360° C., typically for 50 to 200 seconds, preferably for 90 to 150 seconds, at a shear rate ranging from 500 to 5000 $s^{-1}$, preferably 800 to 4800 $S^{-1}$. The phrase "the substantial absence of an oxygen donor" used herein means the absence of any of the oxygen donors described in Japanese Unexamined Patent Publication No. 122103/1991, and thus, the shear treatment is not necessarily conducted under an atmosphere of an inert gas such as nitrogen.

The high shear-treated nitrile group-containing highly saturated copolymer rubber having a lowered Mooney viscosity exhibits a increase 10 units or less, preferably 5 units in the Mooney viscosity of said rubber in 30 days storage in air under room temperature after lowering Mooney viscosity; and has a molecular weight distribution, which is defined by the ratio of a weight average molecular weight(Mw) to a number average molecular weight (Mn), in the range of 3.0 to 5.0, preferably from 3.5 to 4.5 and is substantially free of gel. The average molecular weights are measured by GPC (Gel Permeation Chromatography) using polystyrene standards for calibration.

An apparatus suitable for conducting the high shear treatment may be an extruder equipped with a single screw or multiple screws, wherein a twin screw extruder is preferred. The LID (length/diameter) ratio of an extruder may range from about 10 to 100. In general, the extruder that can be used in the present invention comprises several barrels connected in series, and it is composed of a first section connected to a hopper for injecting raw materials, where as the rubber feed melts, the anti-oxidant is uniformly dispersed therein; a shear section where the dispersion is subjected to high shear conditions under the shear force generated by the screw action at a given high temperature; a degassing region equipped with a degassing vent where volatile by-products are removed under a reduced pressure and an extrusion region equipped with an extruding head through which a sheared rubber having a lowered Mooney viscosity is extruded. The degassing section is preferably maintained at a reduced pressure ranging from 10 to 750 mmHg, more preferably 700 to 750 mmHg, although an ambient pressure may be employed. Further, a kneading promotor such as a zinc salt of 2-benzoamide thiophenol may be added in the above high shear treatment, if so desired.

Among various twin screw extruders which may be advantageously used for a high shear treatment, a twin screw extruder having fully engaging screws rotating in the same direction is particularly preferred. In terms of the shape of screw, it is preferred to employ one having 2 or more flight in the application of a shear force. Usually, double flight screw or triple flight screw is used. Specific embodiments are described below.

The L/D (Length/Diameter) ratio of the extruder preferably ranges from 30 to 50. When the L/D ratio is too low, an effective cooling zone can not be secured and the rubber extruded without sufficient quenching at the outlet of the extruder is difficult to take up, or the rubber extruded at a high temperature is tends to undergo rapid aging or gelation. That is, vigorous shearing of a rubber having a high viscosity generates a large amount of heat which brings the rubber to a high temperature. Therefore, it is required to provide the extruder with an effective cooling zone so as to cool the hot rubber sufficiently before extrusion. It is desirable that the temperature of rubber at the outlet of extruder is kept at below 360° C., preferably below 330° C.

The extruder comprising several barrels connected in series which may be advantageously used in the present invention generally contains three divided sections having a roughly one-third length of the entire length of the extruder. In the first section, which is connected to a hopper for injecting raw materials, the raw materials melts and the anti-oxidant is dispersed in the melt rubber to form a uniform rubber blend. The screws in the first section function primarily to push the rubber forward slowly to make it compact. The temperature at the first section is preferably set such that the melt-extrusion at the subsequent section can proceed in accordance with a preset condition, and, in practice, it is preferably raised to 250° C. in several stages.

In the central section of the extruder of the three divided sections having a roughly one-third length of the entire length of the extruder, a high shear force is applied to the rubber blend by the action of screws at a given high temperature. The temperature in the case is in the range of 240 to 320° C., preferably from 260 to 300° C. When the temperature is too high, the incremental lowering of the Mooney viscosity of the sheared rubber blend becomes greater, but the processed hot rubber is extruded without sufficient cooling, causing degradation and gelation of the rubber. When the temperature of the central section is too low, on the other hand, the degree of lowering of the Mooney viscosity of the rubber becomes small. Although the temperature of the rubber in the central section can be raised using the heat generated by the shear, there emerges the problem of an unreliable extrusion productivity. Therefore, it is preferred to set up the temperature at the above-mentioned range.

In the final section, the high temperature rubber is quenched, water and volatile by-products are removed therefrom through a degassing vent, and a rubber having a lowered Mooney viscosity is extruded through an extruding head. In this section, the screw functions mainly to extrude the rubber, preferably at a low shear condition. It is required to quench the rubber sufficiently during its passage through this section and the residence time of the rubber in this section may be controlled by the pitch of the screw. The temperature of this section is set up in the range of 180 to 250° C., preferably from 190 to 240° C. The degassing region is maintained desirably at a reduced pressure ranging from 10 to 750 mmHg, preferably from 700 to 750 mmHg, although an ambient pressure may be employed.

The anti-oxidant which may be employed in the high shear treatment of this invention is an organic compound that functions to convert radicals or hydroperoxy radicals of rubber fragments generated by oxidation into species which do not participate in oxidative chain reactions or hydroperoxides are converted by the action of the anti-oxidant into stable alcohols. The anti-oxidant is employed for preventing the degradative aging of the rubber and prolongation the life of the rubber.

Representative examples of the anti-oxidant include aromatic secondary amines, amine-ketone condensates, mercaptobenzoimidazoles, bisphenols, monophenols, thiobisphenols, hydroquinones, nickel salts, thioureas, thioethers and phosphorous compounds, among which aromatic secondary amines, amine-ketone condensates, mercaptobenzoimidazoles and bisphenols are preferred.

Aromatic secondary amine anti-oxidants are secondary amines of which nitrogen atom is linked to an aromatic ring, and representative examples thereof include diarylamines such as octylated diphenylamine, alkylated diphenylamine, 4,4'-bis(dimethylbenzyl)-diphenylamine and phenyl(α-naphthyl)amine; diaryl(p-phenylene)diamines such as diphenyl(p-phenylene)diamine and dinaphthyl(p-phenylene)diamine; and alkyl aryl(p-phenylene)diamines such as N-isopropyl-N'-phenyl(p-phenylene)diamine, N-1,3-dimethylbutyl-N'-phenyl(p-phenylene)diamine, N-(3-methacryloyloxy-2-hyroxypropyl)-N'-phenyl(p-phenylene)diamine and N-(methacryloyl)-N'-phenyl(p-phenylene)diamine.

The amine-ketone condensate anti-oxidants are condensation products of aromatic amines and ketones, and representative examples thereof include aniline-ketone condensates, p-phenetidine-acetone condensates, and diphenylamine-acetone condensates.

The representative examples of mercaptobenzoimidazole anti-oxidants include mercaptobenzoimidazole and zinc salts thereof, and mercaptomethylbenzoimidazole and zinc salts thereof.

The representative examples of bisphenol anti-oxidants include bisphenol-alkanes such as 2,2'-methylene-bis(4-methyl-6-t-butylphenol) and 4,4'-butylidene-bis(3-methyl-6-t-butylphenol); and bisphenol-sulfides such as 4,4'-thiobis(3-methyl-6-t-butylphenol).

The representative examples of monophenol anti-oxidants include styrenated phenols, 2,6-di-t-butyl-4-methylphenol, 2,6-di-t-butyl-4-ethylphenol, n-octadecyl-3-(3,5-di-t-butyl-4-hydroxyphenyl) propionate, 2,4-dimethyl-6-(1-methylcyclohexyl)phenol, 2-t-butyl-6-(3-t-butyl-2-hydroxy-5-methylbenzyl)-4-methylphenyl acrylate, and 2-[1-(2-hydro-3,5-di-t-pentylphenyl)ethyl]-4,6-di-t-pentylphenyl acrylate.

The representative examples of thiobisphenol anti-oxidants include 4,4'-thiobis(3-methyl-6-t-butylphenol), 4,4'-bis(3,5-di-t-butyl-4-hydroxybenzyl) sulfide, and 4,4'-thiobis(6-t-butyl-o-cresol).

The representative examples of hydroquinone anti-oxidants include 2,5-di-t-butylhydroquinone and 2,5-di-t-amylhydroquinone.

The representative examples of nickel salt anti-oxidants include nickel dimethyldithiocarbamate, nickel diethyldithiocarbamate, nickel dibutyldithiocarbamate and nickel isopropyl xanthate.

The representative examples of thiourea anti-oxidants include 1,3-bis(dimethylaminopropyl)thiourea and tributylthiourea.

The representative examples of thioether anti-oxidants include dilauryl-3,3-thiodipropionate, distearyl-3,3-thiodipropionate and pentaerythritol tetrakis(3-laurylthiopropionate).

The representative examples of phosphorous anti-oxidants include tris(nonylated phenyl) phosphite.

The anti-oxidant may be suitably employed in an amount ranging from 1 to 10 parts by weight, preferably 2 to 5 parts by weight, based on 100 parts by weight of the nitrile group-containing highly saturated copolymer rubber.

The anti-oxidant may be employed alone or in combination with others. Further, it may be added all at once or stepwise in several portions, to the nitrile group-containing highly saturated copolymer rubber. In the case that two or more anti-oxidants may be employed, for example, an amine-ketone condensate anti-oxidants may be added at first, to a feed rubber composition for extrusion, and then, a mercaptobenzoimidazole anti-oxidant may be added to the rubber extrudate.

In the present invention, a shear-treated nitrile group-containing highly saturated copolymer rubber may be generally employed in an amount ranging from 10 to 90% by weight, preferably 20 to 80% by weight, more preferably 30 to 70% by weight of the mixture composition.

The thermoplastic polymer employed in the present invention may comprises a single thermoplastic polymer or a blend of two or more thermoplastic polymers.

The representative examples of the thermoplastic polymer include aromatic vinyl polymers such as ABS resins, AES resins, MSB resins, AS resins, polystyrene, HIPS, styrene-maleic anhydride copolymers, styrene-acrylonitrile-N-substituted maleimide copolymers and styrene-methacrylic acid copolymers; acrylic polymers such as polymethylmethacrylate, methylmethacrylate-styrene copolymers and methylmethacrylate-styrene-N-substituted maleimide copolymers; polyamide polymers such as 6-nylon, 46-nylon, 66-nylon, 11-nylon, 12-nylon, 610-nylon and 612-nylon; polyester polymers such as poly(ethylene terephthalate) and poly(butylene terephthalate); polyolefin polymers such as polyethylene, polypropylene and polybutene-1; other thermoplastic polymers such as polycarbonates, polyphenylene ether, polyoxymethylene, polyphenylene sulfide, fluorinated resins and liquid crystal polymers; and thermoplastic elastomers such as polyester elastomers, polyamide elastomers, polyamide polyester elastomers, hydrogenated styrene-butadiene-styrene triblock copolymers, styrene-butadiene-styrene triblock copolymers, hydrogenated styrene-isoprene diblock copolymers and thermoplastic polyurethane. Further, the blend of thermoplastic resins that can be used in the present invention include a blend of polystyrene and polyphenylene ether, a blend of ABS resin and thermoplastic polyurethane, a blend of ABS resin and polyamide blend, a blend of ABS resin and polycarbonate blend, a blend of polyamide and polyester and a blend of polypropylene and ethylene-propylene copolymer rubber.

Preferred among the above thermoplastic polymers are aromatic vinyl polymers, acrylic polymers, polyamides, polyesters, polycarbonate resins, polyethers, polyurethanes, poly(vinylidene chloride) resins and fluorinated resins.

Particularly preferred thermoplastic resins that may be employed in the present invention are at leaset one selected from the group of ABS resins, AES resins, MBS resins, AS resins, styrene-maleic anhydride copolymers, 11-nylon, 12-nylon, 610-nylon, polyamide elastomers, polyester elastomers, polycarbonates, poly(ethylene terephthalate), poly(butylene terephthalate), polyphenylene ether, polyoxymethylene, thermoplastic polyurethanes and poly(vinylidene chloride).

Thermosetting resins, which may be employed in the present invention, are heat-curable resins which can be prepared from low molecular weight monomers. Representative examples of the thermosetting resins include various types of epoxy resins including the bisphenol A type, brominated bisphenol A type, brominated novolac type, phenol novolac type, polyglycidylamine type, alcohol type, ester type and aliphatic ring type; xylene resins; guanamine resins; diallyl phthalate resins; vinyl ester resins; phenol resins; unsaturated polyester resins; furan resins; polyimides; poly(p-hydroxybenzoic acid); polyurethanes; maleic acid resins; melamine resins; and urea resins. Among them, epoxy resins, phenol resins and unsaturated polyester resins are preferred.

The amount of the thermoplastic or thermosetting resin employed in the present invention may range generally from 10 to 90% by weight, preferably from 20 to 80% by weight, more preferably from 30 to 70% by weight of the mixture composition. The use of these resins within the specified range can impart good processability and high mechanical strength to the composition. When the content of the thermoplastic or thermosetting resin is too small, a mixture composition may have no resin property and poor processability. On the other hand, when the content of the thermoplastic or thermosetting resin is too great, a mixture composition may have poor elasticity.

The mixture composition of synthetic resin and rubber possesses good processability, the mixture composition may optionally comprise other heat resistant rubber if it is desired. The amount of the other heat resistant rubber is not limited, ranging from 10 to 500 parts by weight, preferably from 50 to 300 parts by weight, per 100 parts by weight of the mixture composition of the present invention.

The heat resistant rubber has a Mooney viscosity of usually 10 to 200, preferably 20 to 150 and more preferably 30 to 100.

Specifically, the heat resistant rubber may be a nitrile group-containing unsaturated copolymer rubber or its hydrogenated form, saturated ethylene copolymer rubber, polyacrylic ester copolymer rubber, polyether rubber, fluorinated rubber or a combination thereof.

The nitrile group-containing unsaturated copolymer rubber or its hydrogenated form was described previously.

The saturated ethylene copolymer rubber is an essentially saturated copolymer of ethylene, α-olefin and a nonconjugated diene. Representative examples thereof include elastomers derived from ethylene, an α-olefin having 3 to 14 carbon atoms and a nonconjugated diene and having a crystallization degree of 20% or less, preferably 10% or less, e.g., an ethylene-propylene-non conjugated diene terpolymer or multi-component polymer rubber, an ethylene-propylene-1-butene-nonconjugated diene copolymer rubber and an ethylene-1-butene-nonconjugated diene multi-component polymer rubber; among which, an ethylene-propylene-nonconjugated diene terpolymer is preferred. Representative examples of the nonconjugated diene include dicyclopentadiene, 1,4-hexadiene, cyclooctadiene, methylenenorbonene and 5-ethylidene-2-norbonene; and, a terpolymer comprising dicyclopentadiene or 5-ethylidene-2-norbonene is preferred.

The above ethylene-α-olefin copolymer rubber has preferably an iodine value of 20 or less.

In the saturated ethylene copolymer rubber, the mole ratio of the ethylene to α-olefin units preferably ranges from 50/50 to 90/10, more preferably from 60/40 to 84/16, while the mole ratio of the (ethylene+α-olefin) units to nonconjugated diene units preferably ranges from 98/2 to 90/10, more preferably from 97/3 to 94/6 in the case that the copolymer is terpolymer or multi-component polymer.

The polyacrylic ester copolymer rubber is a copolymer rubber comprising at least 80 mol % or more of repeating units derived from a alkyl acrylate having alkyl group having 8 or less carbons (e.g., methyl acrylate, ethyl acrylate and propyl acrylate) and/or an alkoxyalkyl acrylate having alkoxyalkyl group having 8 or less carbons (e.g., methoxymethyl acrylate).

Representative examples of copolymerizable monomers employed in the preparation of the polyacrylic ester copolymer include aromatic vinyl monomers, e.g., styrene, α-methylstyrene, vinyl pyridine; fluorine-containing vinyl monomers such as fluoroalkyl vinyl ethers, e.g., fluoroethyl vinyl ether, fluoropropyl vinyl ether, trifluoromethyl vinyl ether, trifluoroethyl vinyl ether, perfluoropropyl vinyl ether, perfluorohexyl vinyl ether, o- or p-trifluoromethyl-styrene, vinyl pentafluorobenzoate, difluoroethylene and tetrafluoroethylene; unsaturated monocarboxylic acids, e.g., acrylic acid and methacrylic acid; unsaturated dicarboxylic acids, e.g., itaconic acid, fumaric acid, maleic acid and anhydride forms thereof; and others, e.g., poly(ethyleneglycol) acrylate, poly(ethyleneglycol)methacrylate, poly(propylene glycol)acrylate, poly(propylene glycol)methacrylate, epoxy acrylate, epoxy methacrylate, urethane acrylate and urethane methacrylate.

Further, a monomer conventionally used as a cross-linkable monomer in a polyacrylic ester copolymer rubber may be employed in the copolymerization. Examples of such cross-linkable monomer are active chlorine-containing unsaturated monomers, e,g., 2-chloroethyl vinyl ether, vinyl chloroacetate, allyl chloroacetate, vinyl benzyl chloride, 2-chloroethyl vinyl ether, chloromethyl vinyl ketone and 5-chloromethyl-2-norbonene; epoxy group-containing unsaturated monomers, e.g., glycidyl acrylate, glycidyl methacrylate, allyl glycidyl ether and vinyl glycidyl ether; and carboxyl group-containing unsaturated monomers, wherein active chlorine-containing unsaturated monomers are preferred.

The polyacrylic ester polymer rubber may preferably have ethyl acrylate units in an amount of 90 mol % or more, preferably 95 mol % or more, and copolymerizable monomer units in an amount of 10 mol % or less, preferably 5 mol % or less, and have essentially no unsaturated carbon-carbon bonds. The inventive mixture composition comprising an ethyl acrylate copolymer rubber has good heat resistance and almost no hardening deterioration. Such an ethyl acrylate copolymer rubber having desirable characteristics may be obtained by copolymerizing ethyl acrylate with a comonomer having no carbon-carbon double bonds (except for those in benzene rings) other than that is directly involved in the polymerization.

A polyunsaturated compound having one or more carbon-carbon double bonds in addition to that involved in the copolymerization with ethyl acrylate (e.g., butadiene, 2-butenyl acrylate, tetrahydrobenzyl acrylate, allyl acrylate, triallyl isocyanurate, divinylbenzene, etc.) has also been used as a cross-linkable monomer in the production of an acryl rubber. However, since such unsaturated compounds may promote hardening deterioration, it is desirable not to employ such compounds when a high heat resistance is required.

The polyether rubber which may be used in the present invention is a polymer or copolymer of at least one monomer selected from epichlorohydrine and alkyloxiranes having 2–10 carbons, or a copolymer containing 90 mol % or more of the above-mentioned monomers and 10 mol % or less of a copolymerizable epoxy compound containing an unsaturated bond.

Representative examples of the alkyloxirane having 2–10 carbons include oxirane, methyloxirane, ethyloxirane, propyloxirane, butyloxirane, hexyloxirane and octyloxirane, among which, oxirane (ethylene oxide) and methyloxirane (propylene oxide) are preferred, and methyloxirane is particularly preferred.

Representative examples of the copolymerizable epoxy compound containing an unsaturated bond include allyl glycidyl ether, vinyl glycidyl ether, glycidyl methacrylate, glycidyl acrylate and glycidyl itaconate, wherein allyl glycidyl ether is preferred.

Specific examples of the polyether rubber are poly-epichlorohydrine rubbers, epichlorohydrine-ethylene oxide copolymer rubbers, epichlorohydrine-ethylene oxide-allyl glycidyl ether copolymer rubbers, epichlorohydrine-ethylene oxide-propylene oxide copolymer rubbers, epichlorohydrine-ethylene oxide-propylene oxide-allyl glycidyl ether copolymer rubbers, and propylene oxide-allyl glycidyl ether copolymer rubber.

The fluorinated rubber which may be used in the present invention is a homopolymer or copolymer of a fluorine-containing monomer. Representative examples of the fluorine-containing monomer include vinylidene fluoride, hexafluoropropene, pentafluoropropene, trifluoroethylene, trifluorochloroethylene, tetrafluoroethylene, vinyl fluoride, and perfluoro(methylvinyl ether) and perfluoro(propyl vinylidene). Representative examples of a monomer copolymerizable with the fluorine-containing monomer include vinyl compounds such as acrylic esters, olefins such as propylene, dienes, and halogene-containing vinyl compounds containing chlorine, bromine or iodine.

Representative examples of the fluorinated rubber include a fluorinated vinylidene-trifluorochloroethylene copolymer, fluorinated vinylidene-hexafluoropropylene copolymer, fluorinated vinylidene-hexafluoropropylene-tetrafluoroethylene terpolymer, tetrafluoroethylene-propylene copolymer, and tetrafluoroethylene-fluorinated vinylidene-propylene terpolymer.

The above examples of fluorinated rubber may be classified into two types: one which is cross-linkable by an organic peroxide and co-agent combination, but not by a polyol or amine cross-linking agent, e.g., JSR AFLAS 150P (a product of Japan Synthetic Rubber); and the other type which is cross-linkable by a polyol- or amine-based crosslinking agent, but not by an organic peroxide, e.g., VITON A, VITON B, VITON C products of DuPont) and TECHNOFLON (a product of Montedison).

Further, a high strength elastomeric composition prepared by incorporating a metal salt of an ethylenically unsaturated carboxylic acid into a nitrile group-containing highly saturated copolymer rubber, e.g., the composition disclosed in Japanese Unexamined Patent Publication 306443/1989, may be employed in the preparation of a heat resistant, high strength rubber composition.

The metal salt of an ethylenically unsaturated carboxylic acid is a metal salt of an ethylenically unsaturated carboxylic acid having 5 or less carbons containing one or more carboxylic groups.

Representative examples of the ethylenically unsaturated carboxylic acid include monocarboxylic acids, e.g., acrylic acid and methacrylic acid; dicarboxylic acids, e.g., maleic acid, fumaric acid and itaconic acid; and unsaturated carboxyl acids having alkyl group having 1–8 carbons, e.g., monomethyl maleate and monoethyl itaconate.

Further, any metal capable of preparation of the metal salt with carboxylic acid. Typical examples of such metal are zinc, magnesium, calcium, barium, titanium, chromium, iron, cobalt, nickel, aluminum, silver and lead. Of these metals, zinc, magnesium, calcium and aluminum are preferred and zinc is more preferred.

The above ethylenically unsaturated carboxylic acid salt has a mole ratio of ethylenically unsaturated carboxylic acid to a metal preferably in the range of 1/0.5 to 1/3.

The metal salt of an ethylenically unsaturated carboxylic acid may be added directly to a nitrile group-containing highly saturated copolymer rubber. Alternatively, a mixture of an ethylenically unsaturated carboxylic acid and an oxide, hydroxide or carbonate of the above-mentioned metal may be added to the nitrile group-containing highly saturated copolymer rubber and reacted to produce a metal salt of an ethylenically unsaturated carboxylic acid in situ, for example, during the compounding process.

The metal salt of ethylenically unsaturated carboxylic acid may be employed in an amount ranging from 3 to 120 parts by weight, preferably from 5 to 100 parts by weight, more preferably from 10 to 60 parts by weight, per 100 parts by weight of the copolymer rubber. When the amount is not in the above range, a rubber having poor tensile properties is obtained.

The mixture composition of the present invention may further comprise other additives depending on its final use. Such additives include cross-linking agents, additional rubber or resin components and other additives conventionally employed in the rubber art such as a reinforcing agent (e.g., carbon black, silica and talc), a filler (e.g., calcium carbonate and clay), a processing aid, a processing oil, other antioxidants, an inhibitor of ozone-induced aging, a silane coupling agent and a colorant.

In particular, a sulfur cross-linking agent or organic peroxide cross-linking agent may be introduced as a cross-linking agent to produce a composition having good cross-liking properties.

Representative examples of the sulfur cross-linking agent include various forms of sulfur such as a sulfur powder, sublimed sulfur, precipitated sulfur, colloidal sulfur, surface-treated sulfur and insoluble sulfur; sulfur compounds such as sulfur monochloride, sulfur dichloride, morpholine disulfide, alkylphenol disulfide, N,N'-dithio-bis(hexahydro-2H-azepinone-2), phosphorous-containing polysulfides, and polymeric polysulfides; and sulfur-containing cross-liking promoters such as tetramethylthiuram disulfide, selenium dimethyldithio-carbamate and 2-(4-morpholinodithio) benzothiazole.

Further, in addition to the above-mentioned sulfur cross-linking agent, the mixture composition also contain a cross-linking activator such as zinc oxide, stearic acid and the like, a cross-linking accelerator such as guanidines, aldehyde-amines, aldehyde-ammonias, thiazoles, sulfenamides, thioureas and xanthates and the like and so on. The sulfur cross-linking promoter may be employed in an amount ranging from 0.10 to 10 parts by weight, preferably from 0.1 to 5 parts by weight, per 100 parts by weight of the mixture composition.

Representative examples of the organic peroxide based cross-linking agent include t-butyl hydroperoxide, cumene hydroperoxide, di-t-butyl peroxide, t-butylcumyl peroxide, 2,5-dimethyl-t-butyl-peroxyhexane, 2,5-dimethyl-t-butyl-peroxyhexyne, 1,3-bis(t-butylperoxyisopropyl)benzene, p-chlorobenzoyl peroxide, t-butyl peroxybenzoate, t-butylperoxyisopropyl carbonate and t-butyl perbenzoate. The organic peroxide-based cross-linking agent may be employed in an amount ranging from 0.01 to 30 parts by weight, preferably from 0.1 to 10 parts by weight, per 100 parts by weight of the mixture composition.

Exemplary cross-linking agents, which may be additionally employed, include multi-functional compounds such as trimethylolpropane trimethacrylate, divinylbenzene, ethylene dimethacrylate and triallyl isocyanurate. Further, other cross-linking agents of the following types may also be used in combination; metal soap/sulfur, triazine/dithiocarbamate, polycarboxylic acid/onium salt, polyamine (e.g., hexamethylenediamine, triethylenetetraamine, hexamethylenediamine carbamate, ethylenediamine carbamate, and triethyleneamine) and ammonium benzoate.

The mixture composition of the present invention may be prepared by a conventional method. For instance, when a thermoplastic resin and a nitrile group-containing highly saturated copolymer rubber are blended, a conventional kneader of an open or sealable type (such as a rubber mill, Brabender mixer, Banbury mixer, a pressure kneader or a twin screw extruder) which can be purged with an inert gas is preferably employed. The kneading process is conducted at a temperature range where all blending components become completely molten, and such temperature range is 150 to 350° C., preferably 170 to 300° C.

On the other hand, when a thermosetting resin and a nitrile group-containing highly saturated copolymer rubber are blended, a low molecular weight monomer, a curing agent and the nitrile group-containing highly saturated copolymer rubber are uniformly blended and then the blend is subjected to a curing reaction, to provide a mixture composition according to the present invention.

BEST MODE OF THE EMBODIMENTS OF THE INVENTION

The following Examples and Comparative Examples are given for the purpose of illustration only and are not intended to limit the scope of the invention. All parts and percentages described in Examples and Comparative Examples are by weight unless indicated otherwise.

(1) Impact Resistance Test

A mixture composition of 70 parts by weight of a thermoplastic resin or a thermosetting resin and 30 parts by weight of a hydrogenated NBR was tested for Izod impact strength (notched part) (kg·cm/cm) at room temperature, in accordance with JIS K7110.

(2) Cross-linked Properties Test (i) Mixture composition of 70 parts by weight of a thermoplastic resin and 30 parts by weight of NBR was tested as below.

A thermoplastic resin and a rubber were melt-extruded using a 20 mm$\phi$ twin screw extruder at 240 to 350° C., and the resulting mixture composition was dried at 80° C. for 12 hours. The mixture composition thus obtained was formed into specimens for the evaluation of various physical properties using a longitudinal injection moulding machine (Yamashiro Seiki Mfs. Co., SAV-30/30) at a composition temperature 240° C. and a mould temperature of 50° C. The specimens were tested for impact resistance and tensile properties [tensile strength (kgf/cm$^2$), tensile stress at 100% elongation (kgf/cm$^2$), and elongation at break (%)]. Further, the hardness of the specimens was measured using a JIS Spring-type A hardness tester.

(ii) Mixture composition comprising a thermosetting resin was tested as below.

A nitrile group-containing highly saturated copolymer rubber were blended with a low molecular weight monomer, a hardner and the like, and then cured to prepare a mixture composition. The mixture composition was tested for the impact resistance and the tensile properties.

(iii) Mixture composition of 30 parts by weight of a thermoplastic or thermosetting resin and 70 parts by weight of NBR was tested as below.

A non-crosslinked rubber composition comprising the components listed in the following Formulation Example was cross-linked at 170° C. for 20 minutes in accordance with JIS K6301 to obtain a sheet having a thickness of 2 mm. A #3 dumbbell specimen was cut out from the sheet to measure the tensile strength (kgf/cm$^2$), tensile stress at 100% elongation (kgf/cm$^2$), and elongation at break (%). Further, the hardness was measured using a JIS Spring-type A hardness tester, and the Pico abrasion was evaluated by measuring the abraded amount in accordance with ASTM D 2228-88. The lower the abraded amount, the higher the abrasion resistance.

Formulation
A Thermoplastic or a Thermosetting Resin

| | |
|---|---|
| + a nitrile group-containing highly saturated copolymer rubber | 100 parts |
| SRF carbon black | 20 parts |
| Zinc oxide | 5 parts |
| Stearic acid | 1 part |
| ADK cizer C-8 | 15 parts |
| Sulfur #325 | 0.5 part |
| Nocceler TT | 1 part |
| Nocceler CZ | 1.5 part |
| Naugard 445 | 2 parts |

Preparation of a Nitrile Group-containing Highly Saturated Copolymer Rubber having a Mooney Viscosity Reduced by a High Shear Treatment 100 Parts of a hydrogenated acrylonitrile-butadiene copolymer rubber (Mooney viscosity: 100, the degree of hydrogenation: 90%, iodine value: 25, and acrylonitrile content: 44%) and 3 parts of an anti-oxidant were charged to a twin screw extruder and subjected to a high shear treatment as described below, to obtain a copolymer rubber (LZP-1), which had a lowered Mooney viscosity of 55 which did not change after a 30 day long storage under an ambient condition in air.

An anti-oxidant used in preparation was poly(2,2,4-trimethyl-1,2-dihydroquinoline).

For comparison, a copolymer rubber (LZP-2) was prepared by repeating the above-mentioned procedure without added anti-oxidant. The Mooney viscosity of LZP-2 was 45, but it increased to 65 after a 30 day storage under an ambient condition in air.

Twin screw extruder:
 Model: Plastic Technology Institute, BT-40;
 Screw diameter: 38 mm;
 Screw length: 1600 mm;
 L/D: 42;
 Number of barrels: 7;
 Rotation speed of screw: 400 rpm;
 Rate of treatment: 7 kg/hr
 Shear rate: 3200 s$^{-1}$
 Residence time: 130–150 seconds.
Set Temperatures:
 Barrel 1 (feeding zone) 100° C.
 Barrel 2 (melting zone) 250° C.
 Barrels 3 to 6 (compounding and shearing zone) 250 to 290° C.
 Barrel 7 (cooling and degassing zone) 200 to 250° C., 720 mmHg Examples 1 to 18 and Comparative Examples 1 to 27

Examples using LZP-1 according to the present invention are listed in Tables 1 and 2, and Comparative Examples using LZP-2, in Tables 3 and 4.

The synthetic resins employed in this study are described below and their Izod impact strength are shown in Table 5.
Polyamide resin: Nylon 6 (Ube Nylon 1013B, Ubekosan)
Polyester resin: Poly(butylene terephthalate) (Duranex 600FP, Polyplastics Co., LTD.)
Polycarbonate resin: Iupilon S-2000 (Mitsubishi Gas Chem.)
Polyetersulfone resin: BICTREX 3601GL20 (Mitsui Toatsu)

Polyphenylene sulfide resin: NOVAPPS 704G40 (Mitsubishi Engineering-Plastics)
Polycarbonate resin/polyester resin (PC/PBT): Iupilon MB4302 (Mitsubishi Gas Chem.)
Polyacetal resin: Duracon M90 (Polyplastics Co.)
Epoxy resin: EPON 828 (Yuka Shell Epoxy Co.)
Phenol resin: Sumilite Resin (Sumitomo Dulez Co.)

TABLE 1

| | Examples | | | | | | | |
|---|---|---|---|---|---|---|---|---|
| | 1 | 2 | 3 | 4 | 5 | 6 | 7 | 8 |
| Polyamide | 70 | 30 | | | | | | |
| Polyester | | | 70 | 30 | | | | |
| Polycarbonate | | | | | 70 | 30 | | |
| Polyethersulfone | | | | | | | 70 | 30 |
| LZP-1 | 30 | 70 | 30 | 70 | 30 | 70 | 30 | 70 |
| Tensile Test | | | | | | | | |
| Tensile Strength | 367 | 347 | 286 | 336 | 540 | 298 | 458 | 348 |
| Elongation (%) | 310 | 480 | 160 | 320 | 120 | 350 | 120 | 280 |
| Tensile Stress at 100% elongation | 178 | 62 | 245 | 77 | 480 | 67 | 421 | 93 |
| Hardness (Shore D) | 72 | 68 | 73 | 72 | 74 | 68 | 87 | 74 |
| Izod Impact Test | | | | | | | | |
| (kg · cm/cm) | 31 | | 47 | | 32 | | 28 | |
| High Temperature Tensile Test | | | | | | | | |
| Tensile Strength | | 176 | | 153 | | 146 | | 187 |
| Elongation (%) | | 290 | | 220 | | 180 | | 220 |
| Tensile Stress at 100% elongation | | 48 | | 47 | | 44 | | 56 |
| Hardness (Shore D) | | 62 | | 64 | | 59 | | 68 |
| Pico Abrasion Test | | | | | | | | |
| abraded Amount (× $10^4$) | | 126 | | 145 | | 122 | | 124 |

TABLE 2

| | Examples | | | | | | | | | |
|---|---|---|---|---|---|---|---|---|---|---|
| | 9 | 10 | 11 | 12 | 13 | 14 | 15 | 16 | 17 | 18 |
| Polyphenylene sulfide | 70 | 30 | | | | | | | | |
| PC/PBT | | | 70 | 30 | | | | | | |
| Polyacetal | | | | | 70 | 30 | | | | |
| Epoxy resin | | | | | | | 70 | 30 | | |
| Phenol resin | | | | | | | | | 70 | 30 |
| LPZ-1 | 30 | 70 | 30 | 70 | 30 | 70 | 30 | 70 | 30 | 70 |
| Tensile Test | | | | | | | | | | |
| Tensile Strength | 466 | 356 | 478 | 318 | 467 | 328 | 590 | 157 | 498 | 145 |
| Elongation (%) | 190 | 260 | 220 | 320 | 210 | 380 | 16 | 180 | 16 | 160 |
| Tensile Stress at 100% elongation | 234 | 115 | 238 | 98 | 243 | 86 | — | 84 | — | 84 |
| Hardness (Shore D) | 78 | 74 | 70 | 69 | 83 | 73 | 75 | 59 | 74 | 57 |
| Izod Impact Test | | | | | | | | | | |
| (kg · cm/cm) | 37 | | 45 | | 34 | | 14 | | 12 | |
| High Temperature Tensile Test | | | | | | | | | | |
| Tensile Strength | | 186 | | 159 | | 201 | | 114 | | 104 |
| Elongation (%) | | 210 | | 170 | | 290 | | 300 | | 250 |
| Tensile Stress at 100% elongation | | 76 | | 45 | | 78 | | 32 | | 28 |
| Hardness (Shore D) | | 70 | | 58 | | 65 | | 57 | | 54 |
| Pico Abrasion Test | | | | | | | | | | |
| abraded Amount (× $10^4$) | | 145 | | 144 | | 123 | | 156 | | 167 |

TABLE 3

TABLE 4

| | Comparative Examples | | | | | | | | | |
|---|---|---|---|---|---|---|---|---|---|---|
| | 9 | 10 | 11 | 12 | 13 | 14 | 15 | 16 | 17 | 18 |
| Polyphenylene sulfide | 70 | 30 | | | | | | | | |
| PC/PBT | | | 70 | 30 | | | | | | |
| Polyacetal | | | | | 70 | 30 | | | | |
| Epoxy resin | | | | | | | 70 | 30 | | |
| Phenol resin | | | | | | | | | 70 | 30 |
| LPZ-2 | 30 | 70 | 30 | 70 | 30 | 70 | 30 | 70 | 30 | 70 |
| Tensile Test | | | | | | | | | | |
| Tensile Strength | 389 | 298 | 456 | 256 | 376 | 236 | 544 | 126 | 446 | 98 |
| Elongation (%) | 80 | 160 | 180 | 230 | 90 | 210 | 6 | 100 | 8 | 90 |
| Tensile Stress at 100% elongation | | 88 | 245 | 67 | | 76 | — | 73 | — | — |
| Hardness (Shore D) | 77 | 72 | 72 | 69 | 86 | 68 | 76 | 62 | 74 | 59 |
| Izod Impact Test | | | | | | | | | | |
| (kg · cm/cm) | 12 | | 28 | | 17 | | 4 | | 2 | |
| High Temperature Tensile Test | | | | | | | | | | |
| Tensile Strength | | 147 | | 105 | | 167 | | 67 | | 47 |
| Elongation (%) | | 160 | | 120 | | 180 | | 320 | | 260 |
| Tensile Stress at 100% elongation | | 66 | | 45 | | 58 | | 23 | | 20 |
| Hardness (Shore D) | | 66 | | 56 | | 61 | | 51 | | 48 |
| Pico Abrasion Test | | | | | | | | | | |
| abraded Amount (× 10$^4$) | | 156 | | 167 | | 145 | | 164 | | 198 |

TABLE 5

| | Comparative Examples | | | | | | | | |
|---|---|---|---|---|---|---|---|---|---|
| | 15 | 16 | 17 | 18 | 19 | 20 | 21 | 22 | 23 |
| Synthetic Resins | | | | | | | | | |
| Polyamide | 100 | | | | | | | | |
| Polyester | | 100 | | | | | | | |
| Polycarbonate | | | 100 | | | | | | |
| Polyether sulfone | | | | 100 | | | | | |
| Polyphenylene sulfide | | | | | 100 | | | | |
| PC/PBT | | | | | | 100 | | | |
| Polyacetate | | | | | | | 100 | | |
| Epoxy resin | | | | | | | | 100 | |
| Phenol resin | | | | | | | | | 100 |
| Izod Impact Test | | | | | | | | | |
| (kg · cm/cm) | 6 | 8 | 18 | 3 | 14 | 23 | 5 | 2 | 3 |

Tables 1 to 5 shows that, the mixture composition of the present invention containing a larger amount of the thermoplastic or thermosetting resin component relative to the rubber component have superior impact resistance over those comparative compositions prepared according to the prior art, and the inventive mixture composition containing a larger amount of the rubber component relative to the resin component have improved strength and abrasion properties.

The shear-treated hydrogenated NBR used in the inventive mixture composition is prepared by treating a hydrogenated NBR with a high shear force in the presence of an anti-oxidant, and this shear treatment not only lowers its Mooney viscosity but also improve the rubber's processability, compatibility with synthetic resins, and storage stability which is manifested by no gelation or no significant increase in the Mooney viscosity. Such improvements in the properties of the shear-treated NBR are believed to be responsible for the above-mentioned improvements in the impact resistance and the strength of the inventive resins. The impact strength of the inventive mixture composition, in particular, is remarkably high as compared with that of a conventional mixture composition prepared using a commercially available non shear-treated hydrogenated acrylonitrile-butadiene copolymer rubber having a Mooney viscosity similar to that of the shear-treated nitrile rubber employed in the present invention.

INDUSTRIAL APPLICABILITY

Since the mixture composition of the present invention have excellent processability, mechanical strength, oil resistance, heat resistance and weather resistance, they can be used in a variety of industrial products such as sealing materials, e.g., O-rings, gaskets, oil seals and freon seals; belts, e.g., V belts for automobiles, poly-ribbed belts and toothed belts; hoses, e.g., power steering hoses for automobiles, high pressure oil-resistant hoses (e.g., oil pressure hoses for various machines such as construction machines), and fuel hoses for automobiles; rollers; rubber products for use at oil and gas wells, e.g., packers, blow out preventers (BOP), and pipe protectors; various diaphragms; clutch plates and break shoes for automobiles (formed by blending the inventive blend with a thermosetting resin such as a phenol or epoxy resin together with other components); and other industrial articles belonging to the classes of vibration isolator rubbers, electric products, automobile parts, shoes, etc.

The inventive mixture compositions are, in particular, useful in the production of automobile parts such as rack and pinion boots, bellows, vacuum connectors, tubes, side mouldings, head rests, regulators, arm rests, shift lever boots, weather strips, air spoiler, suspension boots, belt covers, wheel covers, knobs, bumpers, sight shields and bumper mouldings; and also as industrial articles such as oil pressure hoses, air tubes, rubber hoses, out covers, gaskets, containers, O-rings, and packing materials.

What is claimed is:

1. A mixture composition comprising:
   (A) 90 to 10% by weight of a thermoplastic or thermosetting resin; and
   (B) 10 to 90% by weight of a rubber obtained by subjecting a nitrile group-containing highly saturated copolymer rubber to a high-shear treatment in the presence of an anti-oxidant so as to lower the Mooney viscosity of the copolymer rubber by 15 units or more, having a Mooney viscosity of 5 to 135, a molecular weight distribution (Mw/Mn) of 3.0 to 5.0 and a increase 10 units or less in the Mooney viscosity of said rubber in 30 days storage in air under room temperature after lowering Mooney viscosity.

2. The mixture composition of claim 1, wherein the nitrile group-containing highly saturated copolymer rubber is prepared by hydrogenating 70% or more of the carbon-carbon double bonds present in a copolymer of an ethylenically unsaturated nitrile monomer and a diene monomer.

3. The mixture composition of claim 1, wherein the nitrile group-containing highly saturated copolymer rubber comprises ethylenically unsaturated nitrile monomer units in an amount of 10 to 60% by weight.

4. The mixture composition of claim 1, wherein the nitrile group-containing highly saturated copolymer rubber is subjected to a high-shear treatment so as to lower the Mooney viscosity by at least 30 units, having a Mooney viscosity in the range of 20 to 120.

5. The mixture composition of claim 1, wherein the high-shear treatment is carried out at a shear rate of 50 to 5000 $s^{-1}$, in the absence of added oxygen donors.

6. The mixture composition of claim 1, wherein the mixture composition a increase 5 units or less in the Mooney viscosity of said rubber in 30 days storage in air under room temperature after lowering Mooney viscosity.

7. The mixture composition of claim 1, wherein the anti-oxidant is selected from the group consisting of aromatic secondary amines, amine-ketone condensates, mercaptobenzoimidazoles and bisphenols.

8. The mixture composition of claim 1, wherein the anti-oxidant is employed in an amount ranging from 1 to 10 parts by weight, preferably from 2 to 5 parts by weight, based on 100 parts by weight of the nitrile group-containing highly saturated copolymer rubber.

9. The mixture composition of claim 1, wherein the thermoplastic or thermosetting resin is employed in an amount ranging from 20 to 80% by weight, preferably from 30 to 70% by weight.

* * * * *